United States Patent [19]

Noakes et al.

[11] 4,195,049

[45] Mar. 25, 1980

[54] METHOD OF INCREASING THE STRENGTH OF A BETA SILICON CARBIDE ARTICLE

[75] Inventors: Jack E. Noakes, Plymouth; Leslie L. Terner, West Bloomfield, both of Mich.

[73] Assignee: Ford Motor Company, Dearborn, Mich.

[21] Appl. No.: 924,122

[22] Filed: Jul. 13, 1978

[51] Int. Cl.$^2$ .............................................. C04B 35/56
[52] U.S. Cl. ........................................ 264/63; 106/43; 106/44; 264/82
[58] Field of Search ...................... 106/43, 44; 264/63, 264/82, 81

[56] References Cited

U.S. PATENT DOCUMENTS

| | | | |
|---|---|---|---|
| 3,175,918 | 3/1965 | McGahan | 106/43 |
| 3,463,621 | 8/1969 | Kieffer | 106/43 |
| 3,649,310 | 3/1972 | Yates | 106/44 |
| 3,649,342 | 3/1972 | Bartlett | 106/44 |
| 3,796,564 | 3/1974 | Taylor | 106/44 |
| 3,859,399 | 1/1975 | Bailey et al. | 106/44 |
| 3,882,210 | 5/1975 | Crossley et al. | 264/63 |

*Primary Examiner*—John A. Parrish
*Attorney, Agent, or Firm*—William E. Johnson; Keith L. Zerschling

[57] ABSTRACT

A strong beta silicon carbide article is formed from a moldable mixture including beta silicon carbide particles, from about 1/16% by weight to no more than ¼% by weight of the total weight of the moldable mixture of niobium carbide particles and a binder for supporting these particles for a molding operation. The mixture is molded to form the shape of an article, and the article is pyrolized so that volatile portions of the binder are driven off and the remaining portions broken down to a carbon phase. The carbon phase is transformed to beta silicon carbide in a siliciding operation. The addition of the small percentage of niobium carbide unexpectedly increases the strength of the finished beta silicon carbide article.

2 Claims, No Drawings

METHOD OF INCREASING THE STRENGTH OF A BETA SILICON CARBIDE ARTICLE

BACKGROUND OF THE INVENTION AND PRIOR ART STATEMENT

In a novelty study conducted on the subject matter of this application, U.S. Pat. Nos. 3,649,310; 3,649,342; 3,796,564; 3,859,399; and 3,882,210 were cited. While each of these patents deals with the manufacture of dense solid articles of silicon carbide and/or other materials, none of the patents disclose the effect of a small niobium carbide addition to a basic mixture used to form a beta silicon carbide article and the strengths that are achieved in the finished article with such additions.

The cited patents do not, in any manner, teach that an addition of from about 1/16% by weight to no more than ¼% by weight of niobium carbide particles to a molding mixture which includes beta silicon carbide particles for forming a beta silicon carbide article will result in an unexpected increase in the strength of the final product produced by the molding mixture.

We are unaware of any prior art which, in any way, discusses the increase in strength which may be achieved by a minor addition of niobium carbide particles to a molding mixture used to form beta silicon carbide articles.

It is an object of this invention to provide a method for making beta silicon carbide articles in which an increase in strength is achieved.

SUMMARY OF THE INVENTION

This invention relates to a method of making beta silicon carbide articles and, more particularly, to a method of making beta silicon carbide articles of increased strength.

In accordance with the teachings of the method of this invention, a moldable mixture is formed consisting of (a) beta silicon carbide particles, (b) from at least about 1/16% by weight to no more than ¼% by weight of the total weight of the moldable mixture of niobium carbide particles, and (c) a binder material for supporting the beta silicon carbide particles and niobium carbide particles for a molding operation. The binder used is one which upon pyrolization forms a volatile phase and a non-volatile carbon phase. The moldable mixture is molded into a mold to form an article having the shape of the mold. The article is removed from the mold and pyrolized so that the binder gives off its volatile phase thereby to leave behind its non-volatile carbon phase which binds the beta silicon carbide particles and the niobium carbon particles together in the shape of the article. The article is silicided to transform the carbon remaining from the binder to beta silicon carbide. The preferred addition of niobium carbide particles is ⅛% by weight of the moldable mixture.

The addition of the small amount of niobium carbide is effective to increase the strength of the final article by as much as 50% over the same article produced when no niobium carbide additions have been made. We have found, that if less than or more than the stated amount of niobium carbide additions is made, there is no effect on the strength of the material. Thus, for example, if ½% by weight or more niobium carbide particles are added to the molding mixture, there is no noticeable increase in strength of the resulting article.

We have, thus, established a range of niobium carbide additions from about 1/16% by weight to no more than about ¼% by weight in order to obtain the beneficial effects of the method of this invention. In particular, however, we recommend that the niobium carbide additions be made at about the ⅛% by weight of the total weight of the moldable mixture in order to achieve the maximum benefits of the method of this invention.

DESCRIPTION OF THE PREFERRED EMBODIMENTS

In order to teach the value of the method of this invention, several examples will be set forth below. The art is already familiar with the molding of silicon carbide particles contained in a suitable binder therefor, the subsequent pyrolization of the binder, and the siliciding of the carbon produced upon pyrolization of the binder to produce bodies of silicon carbide. Therefore, in the following examples no great emphasis will be placed on information which is already available to those skilled in the art.

As an additional matter, those skilled in the art are aware of the type of binder materials which may be used, namely, those binders which upon pyrolization in an inert atmosphere or vacuum break down to form a volatile phase which is driven off, and a non-volatile phase of carbon which remains behind to bind the other particles of the molding mixture together. Those skilled in the art are also aware that various blends of particle sizes of material may be used and that a portion of the silicon carbide particles may be replaced with graphite particles which will be converted during the siliciding operation to transform the same to beta silicon carbide. Also, those skilled in the art are aware of siliciding operations by which carbon is transformed to silicon carbide. Generally, since the siliciding reaction takes place at elevated temperatures, the form of silicon carbide produced is beta silicon carbide.

Those skilled in the art are also aware of how to process the various known binder materials in order to pyrolize the same. The temperature and time of pyrolization will vary in accordance with the material used, but the prior art has taught many materials and many pyrolizing parameters which are generally well known. Since these various parameters, as described above, are well known in the art and do not form a portion of the invention herein disclosed, no extensive discussion thereof will be undertaken.

The following examples are intended to illustrate the method of this invention and are not intended to limit the scope thereof. These examples set forth what we feel is the best mode of carrying out our invention.

EXAMPLE 1

A moldable mixture is prepared consisting of 30.0 grams of beta silicon carbide. The beta silicon carbide may be made in accordance with the method set forth in our co-pending application Ser. No. 902,306 filed May 3, 1978 for METHOD FOR MAKING PURE BETA SILICON CARBIDE, which application is incorporated herein by reference. To this material was added 11 grams of a phenolic resin (type 518) which may be purchased from Plastics Engineering Co., Sheboygan, Wis. Also forming a portion of this mixture, is 0.7 grams zinc stearate which is used as a lubricating addition and mold release material, and 0.05 grams niobium carbide (⅛% by weight of the total weight of this moldable mixture). These materials are mixed together in a standard ball milling operation for about 12 hours to prepare the moldable mixture.

In accordance with the teachings of this example, the so-formed molding mixture was injection molded into a mold to form test bars having dimensions of ⅛"×½"×3". The test bars were removed from the mold and pyrolized to break down the phenolic resin binder into its volatile and carbon phases and, thereafter, silicided to chemically react these so-formed carbon to beta silicon carbide.

Individual test specimens of this material were prepared in sample size ⅛"×¼"×1", and were subjected to a four point loading technique rupture test to ascertain the strength thereof. We found that the strength of these specimens was about 50% higher than similar samples made from a molding mixture identical to the one described above without any niobium carbide additions thereto. The 50% increase in strength is an average based upon several samples tested which had been formed from niobium carbide additions and several samples tested which did not have any niobium carbide contained therein.

EXAMPLE 2

A mixture was prepared as set forth in Example 1, except that 0.025 grams of niobium carbide was added. This represents about 1/16% by weight of the weight of the moldable mixture. The moldable mixture was processed as set forth in Example 1 to produce other test specimens. These specimens were tested in the same manner as defined in Example 1. In this case, we found that there was some increase in strength of the test samples over the samples containing no niobium carbide. However, the increase was more in the range of 15 to 25% and was not as great as in the situation where ⅛% by weight of the weight of the moldable mixture niobium carbide was used in the molding mixture.

EXAMPLE 3

This is the same as Example 1, with the sole exception that 0.2 grams of niobium carbide was used in the molding mixture. This represents about ½% by weight of the weight of the molding mixture as niobium carbide particles. In this case, we found that the test specimens had strengths about the same as those specimens tested which had no niobium carbide additions thereto. Thus, the addition of ½% by weight niobium carbide particles to the moldable mixture is excessive and it does not result in any benefit in the strength of the final articles.

By our testing program, we have concluded that niobium carbide additions should not exceed ¼% by weight of the weight of the molding mixture in order to obtain some benefit from the additions. At the ¼% level, the strengths are not as great as at the ⅛% level. Therefore, we recommend that in no case should one exceed the ¼% by weight niobium carbide additions, but preferably one should operate at about ⅛% by weight additions.

In our work, we have tested moldable mixtures containing upwards of 1.5% by weight niobium carbide particles and have found that there is no beneficial effect from such a high level of addition. In fact, we find that the strengths of the test bars are less than that achieved if there is no niobium carbide additions. Thus, we have found that niobium carbide is a beneficial additive in the manufacture of beta silicon carbide articles, but it is only beneficial if the amount used is controlled to a relatively low and precise level of about ⅛% by weight of the moldable mixture used in the molding of the beta silicon carbide article.

While particular embodiments of the method of this invention have been illustrated and described, it will be obvious to those skilled in the art that various changes and modifications may be made to this method without departing from the invention, and it is intended to cover in the appended claims all such modifications and equivalents as fall within the true spirit and scope of this invention.

What is claimed is:

1. A method of making a beta silicon carbide article which comprises:
   forming a moldable mixture consisting of (a) beta silicon carbide particles, (b) from at least about 1/16% by weight to no more than ¼% by weight of the total weight of the moldable mixture of niobium carbide particles, and (c) a binder material for supporting the beta silicon carbide particles and niobium carbide particles for molding operation, said binder being one which upon pyrolization forms a volatile phase and a non-volatile carbon phase;
   molding said moldable mixture into a mold to form an article having the shape of the mold;
   pyrolizing said article formed in the shape of the mold so that said binder gives off its volatile phase thereby to form its non-volatile carbon phase which binds said beta silicon carbide particles and niobium carbide particles together in the shape of the article;
   silicidizing the article to transform the carbon remaining from said binder to beta silicon carbide.

2. The method of claim 1 wherein: said niobium carbide addition is ⅛% by weight of the weight of the moldable mixture.

* * * * *